Oct. 18, 1955     W. K. WARDEN     2,721,048
SHOCK ABSORBER FOR PARACHUTE DROPS
Filed Oct. 4, 1951
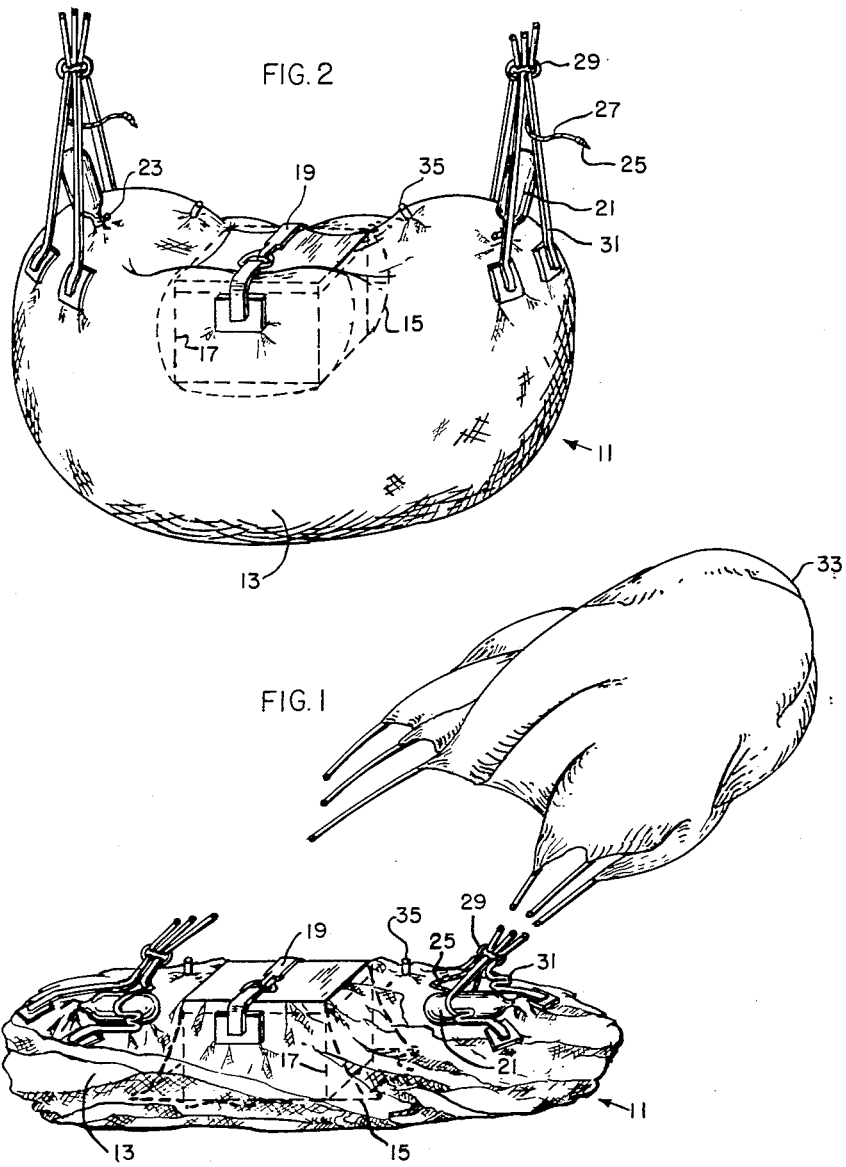
INVENTOR.
WILLIAM K. WARDEN
BY Harry M. Saragovitz
Attorney

2,721,048

SHOCK ABSORBER FOR PARACHUTE DROPS

William K. Warden, Long Branch, N. J., assignor to the United States of America as represented by the Secretary of the Army Application October 4, 1951, Serial No. 249,791

1 Claim. (Cl. 244—138)

(Granted under Title 35, U. S. Code (1952), sec. 266)

The invention described herein may be manufactured and used by or for the Government for governmental purposes, without the payment of any royalty thereon.

The present invention relates to parachute fitted equipment, such equipment being released from aircraft so as to float down to the ground with inclosed supplies or material for use in the vicinity where the parachute is dropped.

The primary object of the invention is to provide a parachute fitted equipment with a shock absorbing means incorporated in said equipment to prevent its being jarred upon reaching the ground, which might cause possible damage to the supplies or materiel contained within said equipment.

Another object of the invention is to provide such parachute fitted equipment, of the character described, which can be inexpensively made and which, upon reaching the ground, can be readily emptied to withdraw the supplies and materiel confined in said equipment.

In certain instances, it is highly desirable that extremely fragile equipment such as medical or electronic supplies, radio sets, or parts thereof, be dropped in a particular locality from the air. In the past, various types of parachute fitted containers have been designed with various forms of cushioning devices forming part of the container to prevent undue damage to the container, or the supplies therein, upon reaching the ground. Included in such forms of cushioning devices are pneumatic tubes or tires; various types of spring mechanisms, cushioning pads of aerated or cellular rubber, or hydraulic or liquid cushions.

It has been discovered, however, that in using any of the devices set forth above certain objectionable features arose, in that supplies and materiel might be damaged when landing due to excessive shock. The present invention seeks to overcome all of the deficiencies in the prior art device by providing a means for permitting the safe descent of materiel and supplies from aircraft by providing a device comprising a double-walled fabric bag constituting a completely inclosed air-bag having a central cavity in which a box or container can be inserted for storing any particular materiel and further characterized by providing means for automatically inflating said bag and providing means to permit the release of sufficient air from the bag to reduce the landing shock when the equipment reaches the ground.

Throughout the specification and claim wherever the term "double-walled bag" appears, it is to be understood that such term is not limited to what might be considered a fabric bag having two contiguous or closely parallel wall surfaces, but rather such term is generally designated to mean a form of structure wherein the exterior or outer wall of the bag forms one surface of an airtight compartment and a secondary wall completes the airtight compartment and forms a smaller compartment which is opened at its top and capable of having inserted therein a box or container for materiel or supplies.

The invention can be best understood from the following description, to be read in connection with the following drawing, in which:

Fig. 1 is a view showing the equipment immediately after it is released from the plane, with the canopy of the parachute partially opened and the bag in its deflated state, and, Fig. 2 shows the bag and a container positioned within the inner cavity of the bag in its downward descent.

Referring to the drawing, the equipment comprises essentially a double-walled fabric bag generally designated as 11, and having an outer wall 13, and inner wall 15. As seen from the drawing (Fig. 2), it is evident that such form of construction will result in a completely inclosed air-bag having a central cavity forming a compartment, the boundary of which is the inner wall 15. A box or container 17, within which materiel or supplies can be readily placed, is held within the compartment heretofore mentioned. A strap 19 is provided which is secured to the outer wall 13, which strap serves to secure the box 17 from being displaced or moved about within the compartment. For inflating the bag there are provided a pair of compressed air cylinders 21, each of which has its respective nozzle end extending into the bag. The neck of each compressed air cylinder is provided with a valve 23, to control the entry of the compressed air into the bag 11.

Each of the valves is provided with a pin 25 which, when disengaged from its position in the valve, opens the valve and permits the entry of the compressed air from the cylinder into the bag. Such form of pin releasing mechanisms in release valves are of conventional design and, therefore, are not fully described herein. The pins 25 are held by lines 27, which lines are individually secured to rings 29. Secured to the outside of the bag 11 are the ends of shroud lines 31, which extend through the ring 29 and which have their other ends supporting a parachute canopy 33. As can be observed in Fig. 2 of the drawing, the lines 27, holding the pins 25, are shorter than that portion of the shroud lines 31 extending from the ring 29 to the surface of the bag. The outer wall of the bag is provided with a pair of pressure relief valves 35, which open in the manner as explained hereinafter.

In operation, the entire equipment is carried in the aircraft until such time as it is desired to drop the load of materiel contained within the box 17. At such time, the entire assembly is dropped from the aircraft. Almost instantaneously, the canopy 33 will tend to unfurl and open. However, due to the comparative shortness of the lines 27, such lines will be drawn taut and the pins 25 will become disengaged from the valve 23 of the air cylinders 21, thereby allowing the compressed air to inflate the bag 11. By then, the parachute will be fully opened, retarding the rapid descent of the bag 11. At the moment the bag reaches the ground, it will be compressed thereby increasing the internal pressure within the bag and causing relief valves 35 to open, permitting the escape of some of the air from the bag. In such deflated condition, the bag will not bounce or rebound unnecessarily upon reaching the ground and will settle and land with a minimum jarring shock. The box 17 can then be readily removed from hte cavity within which it is confined and any materiel or supplies withdrawn therefrom.

By the use of the subject invention, it is apparent that the equipment described herein affords an effective shock absorbing means for any materiels dropped from an aircraft.

While the invention has been described in detail with respect to certain preferred examples and embodiments, it will be understood by those skilled in the art that various changes and modifications may be made without departing from the spirit and scope of the invention, and it is intended, therefore, in the appended claim, to cover all such changes and modifications.

What is claimed is:

An aerial delivery device comprising an airtight bag having a central cavity, a compressed air container for inflating said bag, a parachute secured to said bag, valve means on said compressed air container responsive to the opening of said parachute, and a pressure relief valve on the outer wall of said bag and extending partially into said bag which is normally closed, but opened when said device is impacted upon reaching the ground to partially deflate said bag whereby rebounding of said bag is reduced to a minimum.

References Cited in the file of this patent

UNITED STATES PATENTS

| | | |
|---|---|---|
| 2,111,886 | Capel | Mar. 22, 1938 |
| 2,363,249 | Hutchinson | Nov. 21, 1944 |
| 2,452,783 | Nebesar | Nov. 2, 1948 |
| 2,457,205 | Campbell | Dec. 28, 1948 |

FOREIGN PATENTS

| | | |
|---|---|---|
| 197,803 | Great Britain | May 24, 1923 |
| 663,194 | France | Mar. 30, 1929 |